Oct. 25, 1949.　　T. A. CAMPBELL ET AL　　2,486,113
HYDRAULIC COUPLER

Filed Dec. 22, 1947　　2 Sheets-Sheet 1

Inventors:
Thomas A. Campbell
Ernest G. Stock
By Hinkle, Horton, Ahlberg, Hausmann & Kippe
attorneys.

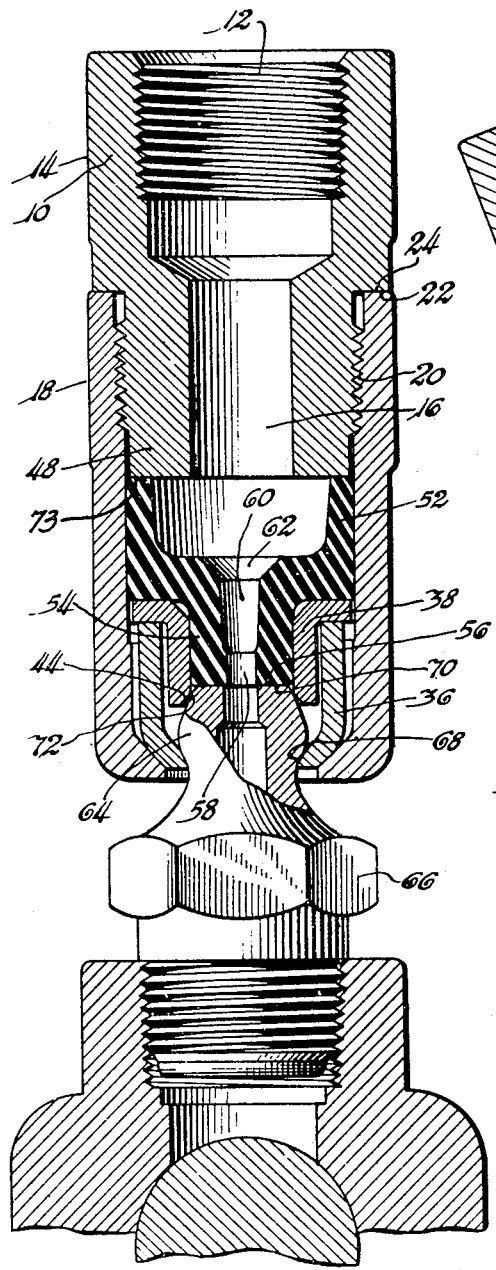
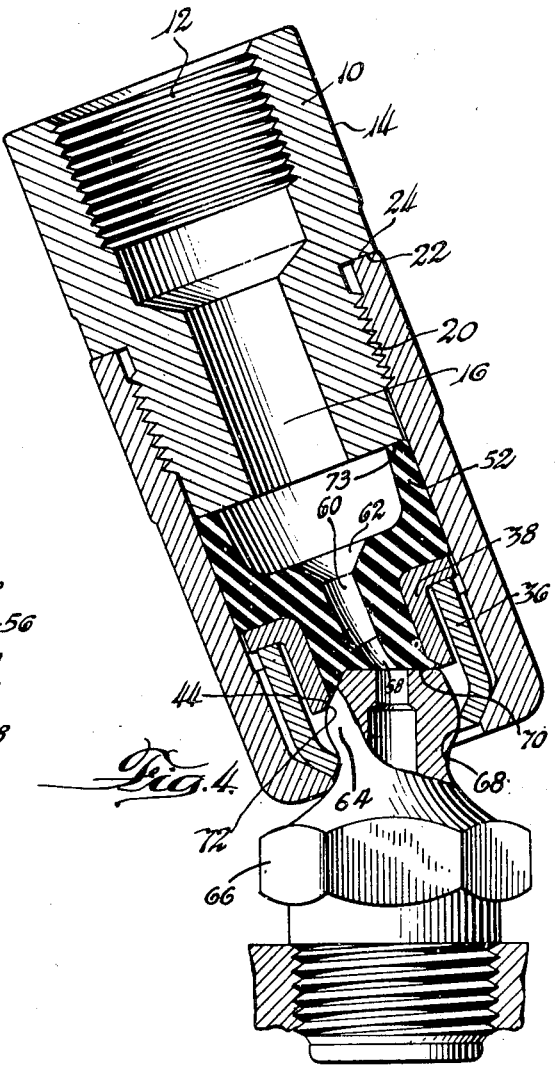

Patented Oct. 25, 1949

2,486,113

UNITED STATES PATENT OFFICE 2,486,113

HYDRAULIC COUPLER

Thomas A. Campbell and Ernest G. Stock, Chicago, Ill., assignors to Stewart-Warner Corporation, Chicago, Ill., a corporation of Virginia Application December 22, 1947, Serial No. 793,130

7 Claims. (Cl. 285—168)

Our invention relates to hydraulic couplers and more particularly to couplers especially adapted for connecting a lubricant compressor or other source of lubricant under pressure with a lubricant receiving fitting permanently attached to the bearing of an automobile or other machine.

In present lubricating practice it is common to provide the bearings of automobiles and other machines with headed grip-type lubricant receiving fittings and to supply such fittings with lubricant through a coupler which is successively attached to the several fittings of the automobile or other machine. Such couplers usually have means for forming an interlocking connection with the headed, lubricant-receiving fitting to prevent separation of the coupler and fitting during the lubricating operation. The more desirable forms of such couplers are adapted to provide a swiveling connection with the fitting so that it is not necessary that the coupler be in direct axial alignment with the axis of the fitting to effect a lubricant-tight seal therewith.

In such prior art couplers it is usual to provide a metal to metal seal between the coupler and fitting, and in some instances this seal is initially spring-pressed to give a snap action which secures a coupler to the fitting before lubricant pressure is applied. Such couplers, however, are relatively expensive to manufacture and are not effective to form a lubricant-tight seal with the fitting if the sealing edge of the fitting is even slightly marred or defective for any reason. Furthermore, such couplers are not well adapted for use with low viscosity lubricants, or near fluid greases particularly where the lubricant is supplied under very light pressure. It is impossible to use, for example, even a heavy motor oil.

Attempts have been made to overcome these disadvantages by utilizing rubber-like gaskets to create a seal between the coupler and fitting, but difficulties have been encountered because of the destructive action of high pressure and swiveling motions on these gaskets. An example of such a coupler is disclosed in Campbell Patent No. 2,362,880 of November 14, 1944, for a large size, large volume coupler especially designed for military tanks, and wherein the rubber-like sealing means engages and forms a ball and socket joint with the rounded head of the lubricant fitting but wherein the other side of the gasket is protected by a metal plate against force created by the lubricant pressure.

The prior art does not provide an inexpensive, compact coupler having a rubber-like sealing member adapted to form a swiveling connection with fittings having both rounded and flattened coupler engaging ends and wherein an initial sealing force is reinforced by lubricant pressure acting on a surface of the sealing member substantially parallel to the fitting-engaging surface thereof. An object of our invention is to provide such a coupler.

Another object of our invention is to provide a hydraulic coupler of the swiveling type having new and improved means for compensating for variations in axial position of the fitting head in the coupler due to swiveling motion between the coupler and fitting.

Another object of our invention is to provide a coupler having new and improved clamping jaws for gripping a lubricant-receiving fitting.

Another object of our invention is to provide a hydraulic coupler of the swiveling type which is of smaller diameter than present day couplers and can be used to reach parts which are now inaccessible to couplers of this general type.

Another object of our invention is to provide a hydraulic coupler of the swiveling type which is capable of universal use in the transmission of liquids and semi-liquids throughout an extremely wide pressure range.

Other objects and advantages will become apparent as the description proceeds.

In the drawings forming a part of this application:

Fig. 3 is a longitudinal sectional view of the coupler of Fig. 1 showing it applied to a fitting and in direct axial alignment therewith; and Fig. 4 is a view similar to Fig. 3 but showing the coupler located at an angle to the axis of the fitting.

Figure 1:
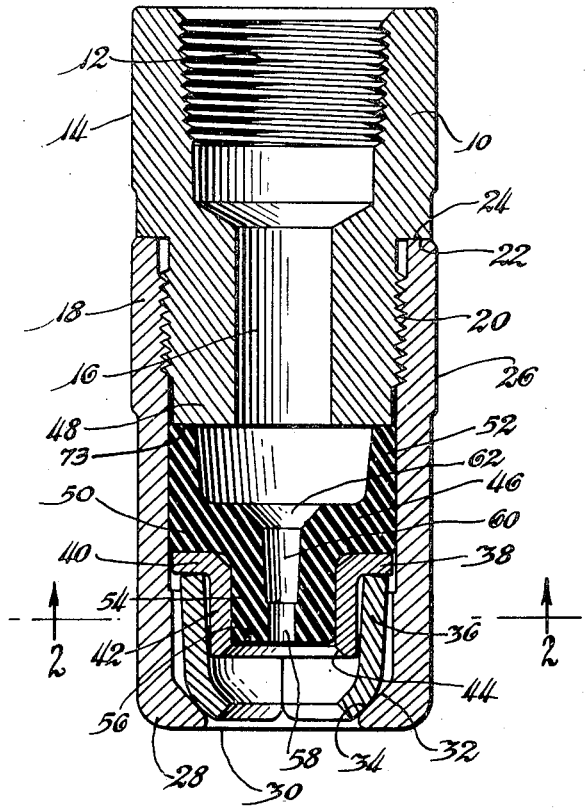
Fig. 1 is a longitudinal sectional view through a coupler embodying a preferred form of our invention.
Figure 2:
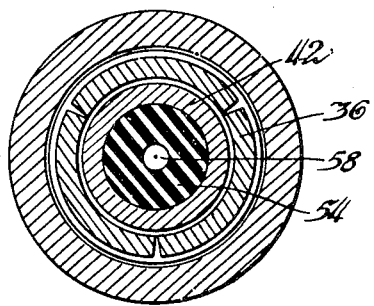
Fig. 2 is a transverse sectional view of the coupler taken on the line 2—2 of Fig. 1.

The coupler shown in the drawings comprises a body or adapter 10 having a threaded inlet end 12 for attachment to the flexible hose or rigid pipe extension of a lubricant compressor or to any other suitable source of liquid or semi-liquid material under pressure. The adapter 10 is provided with a nut-like portion 14 to facilitate its attachment to such a flexible hose, and this adapter is further provided with a bore 16 which is in communication with the threaded inlet and cooperates therewith to form a passageway throughout the length of the adapter 10. A sleeve 18 is attached by threads 20 to the adapter 10 and the end 22 of the sleeve directly engages a shoulder 24 of the adapter accurately to determine the extent to which the adapter and sleeve telescope. The sleeve 18 is also preferably provided with a nut-like portion 26.

The forward or outlet end of the sleeve 18 is inturned as shown at 28 and defines an opening 30 adapted to receive the inlet end of a lubricant-receiving fitting like that shown in Figs. 3 and 4. The inturned end 28 of the coupler sleeve 18 is provided with a conical or tapered inner surface 32 adapted to be engaged by the correspondingly inclined or tapered surfaces 34 of jaws 36 of which three are usually provided, although the number of such jaws may be varied in accordance with the needs of different sizes and types of couplers for different purposes. The jaws 36 are preferably stamped out of sheet metal.

The bases of the jaws 36 are engaged by the horizontal flange 38 of a generally hat-shaped member or jaw ring 40 having a forwardly extending cylindrical portion or sleeve 42 terminating in a conical guiding surface 44. The flange 38 is preferably of substantially the same diameter as the internal diameter of the sleeve 18 so that the jaw ring 40 always remains in a coaxial position with respect to the coupler and substantially perpendicular to the axis thereof under all differences in the positional relationship between the end of the fitting and the axis of the coupler when the coupler and fitting are not in true axial alignment.

A sealing member indicated generally by reference numeral 46 has a cup-like portion interposed between the jaw ring 38 and the lower end 48 of the adapter 10. This cup-like portion includes a base or shoulder 50 directly engaging the jaw ring 40 and a flange 52 extending upwardly along the inner wall of the sleeve 18 and engaging the end 48 of the adapter 10 to form a fluid-tight seal between the adapter and sleeve.

This sealing member 46 also has a lower end or tip 54 extending down into the cylindrical portion 42 of the jaw ring 38. This lower end terminates in a flat surface 56 and is provided with a series of connecting passageways 58, 60, and 62 of successively increasing diameter. This sealing member is preferably formed of synthetic rubber or other suitable material having a high degree of flexibility and great strength. A suitable material is the synthetic rubber now on the market under the trade name Hycar as this material is quite soft and easily distortable having a flexibility approximately one-half that of natural rubber and a strength 10 to 20 times greater and being resistant to lubricant deterioration. It also has extremely good recovery from "compression set" and returns to its original shape very quickly compared to other synthetics.

When the coupler is applied to a lubricant-receiving fitting, the jaws 36 are forced backwardly and their inturned ends are spread apart sufficiently to permit the passage of the head 64 of a fitting 66 of the kind illustrated in Fig. 3. When the coupler is fully applied to the fitting as shown in Fig. 3 the jaws engage a spherical surface 68 provided by the neck of the fitting and the flat end 56 of the sealing member engages the flat end 70 of the fitting. The circular edge 72 of the fitting which surrounds the flat end 70 engages the tapered surface 44 at the lower end of the jaw ring 38. In this position of the parts and as shown in Fig. 3, the flange 52 of the sealing member is slightly compressed with the result that the jaws 36 secure an initial grip on the fitting and the flat end 73 of the sealing member rests against the adapter face 48 and forms a seal which is effective to prevent escape of even light oil or any other low viscosity liquid or grease. The rubber wall section 52 therefore acts similar to a compressible spring as a substitute for such.

In a lubricating operation such attachment of the coupler to the fitting is followed by operation of a lubricant compressor or opening of a valve whereby lubricant is delivered to the coupler and fitting. Where the lubricant is being supplied to the interior of a housing, or where a light lubricant is delivered to a bearing offering little resistance to flow of the lubricant, the pressure may be negligible. On the other hand, where a lubricant is being supplied from a high pressure compressor to a bearing which is clogged with a mixture of dirt and the hardened residue from a former greasing operation, an extremely high pressure on the order of 12,000 or 15,000 pounds per square inch may be necessary. An important feature of the design and construction of our coupler lies in the manner in which this high lubricant pressure is made available to increase the gripping and sealing action without injuring or destroying the rubber-like sealing member.

The pressure on the lubricant acts on the interior of the cup-like upper end of the sealing member and causes the flange 52 thereof to seal more firmly against the inside of the sleeve 18 and the lower end 48 of the adapter. At the same time the lubricant pressure exerts a downward force on the base of this cup-like portion and on the jaw ring 38 and jaws 36 therebeneath. An oppositely directed force is exerted on the end 48 of the adapter tending to produce relative movement between jaws 36 and tapered portion 32 of the sleeve 18 whereby the jaws are caused to grip more firmly about the fitting.

Engagement between the end of the fitting and the tapered surface 44 at the lower end of the jaw ring 38 prevents the jaw ring from being forced downwardly over the end of the fitting and limits forward or downward movement of the jaws under the influence of the lubricant pressure. Increased gripping action of the jaws is primarily occasioned by upward or backward movement of the coupler sleeve 18 since the fitting is attached to an automobile or other machine and is ordinarily stationary. When the coupler and fitting are in exact alignment the jaws remain in position immediately below the largest diameter of the head as shown in Fig. 3 instead of being forced downwardly to engage the smallest part of the fitting neck.

An important feature of our invention lies in the fact that a part of the force exerted by the lubricant pressure acting on the rubber-like sealing member is available to reinforce the seal between the tip of this sealing member and the end of the lubricant-receiving fitting. In order, however, successfully to provide a rubber-like sealing member of the kind herein disclosed and wherein the pressure of the lubricant is utilized both to advance the jaws and form a sealed connection by acting on the sealing member, the construction and arrangement of the parts must be such as to prevent excessive pressures from injuring the sealing member. In our invention this is accomplished by giving the tip of the sealing member a diameter such that approximately one-fourth of the force exerted by the lubricant pressure on the sealing member is utilized to reinforce the seal between the coupler and fitting.

Furthermore, the tip of the sealing member is located in the sleeve-like portion 42 of the metal jaw ring 38 which serves both to limit penetration of the end of the lubricant fitting and to prevent spreading of the tip end of the rubber-like sealing member.

When the coupler is applied to the fitting at an angle as indicated in Fig. 4, the tip of the sealing member is distorted to conform to the angular position of the flat end of the fitting with relation to the axis of the coupler as clearly shown in this figure. In this respect the sealing relationship between our novel coupler and a fitting is entirely different from that between the coupler and fitting of the Campbell Patent No. 2,362,880 previously referred to. In that patent the coupler coacts with a rounded fitting so that swiveling of the coupler with respect to the axis of the fitting merely produces a ball and socket joint type of action with no resulting distortion of the sealing member. In the instant coupler, however, the normally flat end of the tip of the sealing member is distorted into a wide variety of irregular shapes to conform to different positions of the flat end of the fitting with relation to the sealing member when the coupler is placed at different angles with respect to the axis of the fitting.

In all of these angular relationships between the coupler and fitting, however, the force exerted by the gripping jaws tending to pull the coupler into the fitting is resisted by the metal to metal contact between the end of the fitting and the tapered surface 44 of the jaw ring 38. Likewise, in swiveling the coupler about the fitting while the parts are under lubricant pressure, this tapered metal surface takes all swiveling wear so that the sole function of the tip of the sealing member is to conform to different positions of the end of the fitting and effect a lubricant-tight seal therewith.

In order to understand the swiveling relationship between the coupler and fitting it is well to bear in mind that the spherical jaw-engaging surface 68 of the fitting and the edge bounding its flat end are located in the same spherical surface, giving in effect a metallic ball and socket relationship between the coupler and fitting in which, however, the sealing member does not share. In this connection it also should be noted that the fitting-engaging end of the metal sleeve 42 is chamfered or tapered as indicated at 44 and we have found that the best results are obtained when this taper has an angle of approximately 45° with respect to the axis of the sleeve.

Another feature of our invention lies in the fact that our coupler will form an interlocking connection and a seal with the fitting at an angle to the axis of the fitting almost twice as great as that at which the conventional coupler will retain its seal. The size of the passageway at the outlet end of the tip of the sealing member has an important bearing on this degree of angularity and in practice we preferably make this passage with an area approximately one-fourth of the area of the flat end 70 of the fitting. When the coupler and fitting are in axial alignment, the sealing member is under sufficient compression to provide an initial seal capable of preventing leakage of even light oil at substantially zero pressure.

This perfect seal, capable of preventing leakage of even light oil at substantially zero pressure, is also maintained when the coupler is located at any angle to the axis of the fitting between zero degrees and 15° to one side of such axis. However, when the coupler is located between 15° and 30° to one side of such axis—the latter being approximately the limit of effective use of our coupler—the rubber-like sealing member is not initially under sufficient distortion to make a lubricant-tight seal but upon the application of even light oil at 50 pounds pressure or more the sealing member immediately distorts sufficiently to fit perfectly the end of the fitting and form a lubricant-tight seal. Since approximately 15° angularity is the limit of effective use of the conventional coupler, it will be immediately apparent that our coupler has an effective angularity approximately twice that of the conventional coupler.

From the foregoing description taken in connection with the accompanying drawings, it will be apparent that our coupler is of extremely simple and rugged design and has relatively few parts. For a given size of fitting our novel coupler can be made with a much smaller outside diameter than the conventional couplers in use today and this is of great advantage in reaching fittings located in recesses or surrounded by other parts of the machine so that they are inaccessible to a large coupler, or a large coupler must be applied and removed in exact axial alignment, whereas our coupler, because of its smaller size, can be placed at a substantial angle to the axis of the fitting.

Among the other numerous advantages of our coupler is its ability to seal despite irregularities in the sealing surface of the fitting or the presence of dirt or other extraneous material on such surface. Our coupler is also capable of use interchangeably with fittings having both flat ends and rounded ends and is the only coupler presently available which will coact with a flat ended fitting to form a seal capable of preventing the escape of light oil at low pressure.

While we have illustrated and described only a single embodiment of our invention, it is to be understood that our invention is capable of numerous modifications and variations and that our invention includes all modifications, variations, and equivalents coming within the scope of the appended claims.

We claim:

1. In a high-pressure coupler having a body, a tubular part threadedly attached to said body, said part and body having engaging surfaces to limit telescoping thereof, said tubular part having a tapered jaw-engaging surface, and a plurality of jaws movably located in said tubular part and having portions engaging said surface; the combination of a ring engaging an end of each of said jaws and having a forwardly projecting sleeve terminating in a fitting-engaging end, and a sealing member of rubber-like material having a cup-shaped portion confined between said ring and body and sealing the joint between said body and tubular part, said sealing member having a tubular tip of smaller diameter extending into said sleeve and terminating in a flat fitting-engaging end adjacent the fitting-engaging end of said sleeve, said sleeve limiting penetration of a fitting and cooperating with a fitting to prevent escape of said rubber-like material under maximum fluid pressure, said sealing member being exposed to fluid pressure and acting through said ring to cause said jaws to firmly grip a fitting through a substantial range of angular movement with a force proportional to the fluid pressure, the fluid pressure acting on said sealing member also holding said flat end in sealing engagement with a fitting.

2. In a coupler having a body, a tubular part extending forwardly from said body, said tubular part having a tapered jaw-engaging surface, and a jaw-like gripping means movably located in said tubular part and engaging said surface; the combination of a metal ring engaging an end of said gripping means and having a forwardly projecting sleeve terminating in a fitting-engaging end, and a sealing member of rubber-like material having a large diameter portion located between said ring and body, said sealing member having a tubular tip of smaller diameter extending into said sleeve and terminating in a fitting-engaging end adjacent the fitting-engaging end of said sleeve, said sleeve limiting penetration of a fitting and cooperating with a fitting to prevent escape of said rubber-like material, said sealing member being subjected to fluid pressure and acting against said ring to cause said gripping means to firmly grip a fitting through a substantial range of angular movement with a force proportional to the fluid pressure, the fluid pressure acting on said sealing member also holding said tip in sealing engagement with a fitting.

3. In a coupler for application in various angular relationships to a variety of headed fittings including flat-ended fittings and round-ended fittings, and having a body, a tubular part extending forwardly from said body and provided with a tapered jaw-engaging surface, and jaw-like gripping means movably located in said tubular part and engaging said surface; the combination of a metal ring having a lateral flange engaging said gripping means and a forwardly projecting sleeve provided with a plain bore and having a fitting-engaging edge forming a metal sliding bearing surface determining the positive depth of engagement of fittings gripped by the coupler, and a resilient sealing member having a large diameter base portion located in said tubular part and exposed to lubricant pressure, said sealing member having a forwardly extending tip terminating in a surface capable of distortion to seal with either flat-ended or round-ended fittings in various angular relationships, said tip being located in said sleeve and being of smaller diameter than said base portion, said tip being exposed to lubricant pressure whereby distortion of said sealing surface is facilitated by a force exerted on said tip by fluid under pressure, said ring and sealing member exerting locking force on said jaws proportional to fluid pressure.

4. In a coupler having a body provided with an inlet passage, a tubular part extending forwardly from said body and defining a chamber communicating with said passage, said tubular part having an inturned forward end for receiving a connecting fitting in either axial alignment or in any angular relationship within a substantial range of misalignment, and jaw-like gripping means within said tubular part for forming an interlocking connection beneath a head of a fitting; the combination of an annular supporting and confining means in rear of said gripping means and slidably mounted in said tubular part, said supporting and confining means having a plain axial bore terminating in a fitting-engaging edge, and a resilient multi-diameter sealing member slidably mounted in said tubular part, said sealing member having a large diameter base in rear of said supporting and confining means and a small diameter extension projecting into said bore and terminating adjacent said edge in a fitting-engaging sealing surface, said edge limiting penetration of the end of the fitting and cooperating with the fitting to prevent escape of the resilient material of the sealing member, said sealing member having an axial passage therethrough, said sealing member and said supporting and confining means being acted upon by fluid pressure in said chamber to cause said gripping means to grip a fitting with a force substantially proportional to the fluid pressure, said fluid pressure also being transmitted through said resilient sealing member to reinforce the seal between said surface and a fitting and to maintain said seal in all angular relationships within said range.

5. In a high-pressure lubricant coupler having a body, a tubular part threadedly attached to said body, said part and body having engaging surfaces to limit telescoping thereof, said tubular part having a tapered jaw-engaging surface, and a plurality of jaws movably located in said tubular part and having portions engaging said surface; the combination of a hat-shaped, metal ring having a flange slightly smaller in diameter than the interior of said tubular part and perpendicular to the axis thereof and engaging an end of each of said jaws, said ring having a forwardly projecting sleeve with uniform bore terminating in an outwardly chamfered fitting-engaging end, and a sealing member of rubber-like material having a cup-shaped portion confined between said ring and body and sealing the joint between said body and tubular part, said cup-shaped portion having an outside diameter substantially equal to the internal diameter of said tubular part and a relatively thin side wall under compression to effect an initial mechanical grip on a fitting, said sealing member having a tubular tip of smaller diameter extending into said sleeve, said sleeve limiting penetration of a fitting and cooperating with a fitting to prevent escape of said rubber-like material under maximum lubricant pressure, said sealing member being exposed to lubricant pressure and acting through said ring to cause said jaws to grip a fitting with a force proportional to the lubricant pressure, the lubricant pressure acting on said sealing member also holding said flat end in sealing engagement with a fitting.

6. In a coupler having a body, a tubular part extending forwardly from said body, said tubular part having a tapered jaw-engaging surface, and a jaw-like gripping means movably located in said tubular part and engaging said surface; the combination of a metal ring engaging an end of said gripping means and having a forwardly projecting sleeve terminating in a fitting-engaging end, and a sealing member of rubber-like material having a large diameter portion located between said ring and body, said sealing member having a tubular tip of smaller diameter extending into said sleeve and terminating in a fitting-engaging end adjacent the fitting-engaging end of said sleeve, said sleeve limiting penetration of a fitting and cooperating with a fitting to prevent escape of said rubber-like material, said sealing member being subjected to fluid pressure and acting against said ring to cause said gripping means to firmly grip a fitting through a substantial range of angular movement with a force proportional to the fluid pressure, the fluid pressure acting on said sealing member also holding said tip in sealing engagement with a fitting, the diameter of said tubular tip being such that not more than one-fourth of the total force exerted by fluid pressure in said coupler urges said tip into sealing engagement with a fitting.

7. In a high-pressure coupler having a body provided with an inlet passage, a tubular part extending forwardly from said body and defining a chamber communicating with said passage, said tubular part having an inturned forward end for receiving a connecting fitting in either axial alignment or in any angular relationship with a predetermined range of misalignment, and jaw-like gripping means within said tubular part for forming an interlocking connection beneath a head of a fitting; the combination of an annular supporting and confining means in rear of said gripping means and slidably mounted in said tubular part, said supporting and confining means having an outside diameter slightly smaller than the interior of said tubular part and a plain axial bore terminating in a fitting-engaging edge, and a resilient multi-diameter sealing member slidably mounted in said tubular part, said sealing member having a large diameter base in rear of said supporting and confining means and a small diameter extension projecting into said bore and terminating adjacent said edge in a flat, fitting-engaging sealing surface, said edge limiting penetration of the end of the fitting and cooperating with the fitting to prevent escape of the resilient material of the sealing member, said sealing member having an axial passage therethrough, the base of said sealing member being cup-shaped and under compression to effect an initial mechanical grip on a fitting, said sealing member and said supporting and confining means being acted upon by fluid pressure in said chamber to cause said gripping means to grip a fitting with a force substantially proportional to the fluid pressure, said fluid pressure also being transmitted through said resilient sealing member to reinforce the seal between said surface and a fitting and to maintain said seal in all angular relationships within said range, said small diameter extension being of such size that not more than one-fourth of the total force exerted by the fluid pressure is utilized to reinforce the seal between the sealing member and a fitting.

THOMAS A. CAMPBELL.
ERNEST G. STOCK.

REFERENCES CITED

The following references are of record in the file of this patent:

UNITED STATES PATENTS

| Number | Name | Date |
|---|---|---|
| 2,311,097 | Sundholm | Feb. 16, 1943 |
| 2,362,880 | Campbell | Nov. 14, 1944 |

Certificate of Correction

Patent No. 2,486,113 October 25, 1949

THOMAS A. CAMPBELL ET AL.

It is hereby certified that error appears in the printed specification of the above numbered patent requiring correction as follows:

Column 8, line 6, for "avial" read *axial*;

and that the said Letters Patent should be read with this correction therein that the same may conform to the record of the case in the Patent Office.

Signed and sealed this 3rd day of January, A. D. 1950.

[SEAL]

THOMAS F. MURPHY,
*Assistant Commissioner of Patents.*